Patented Nov. 12, 1946

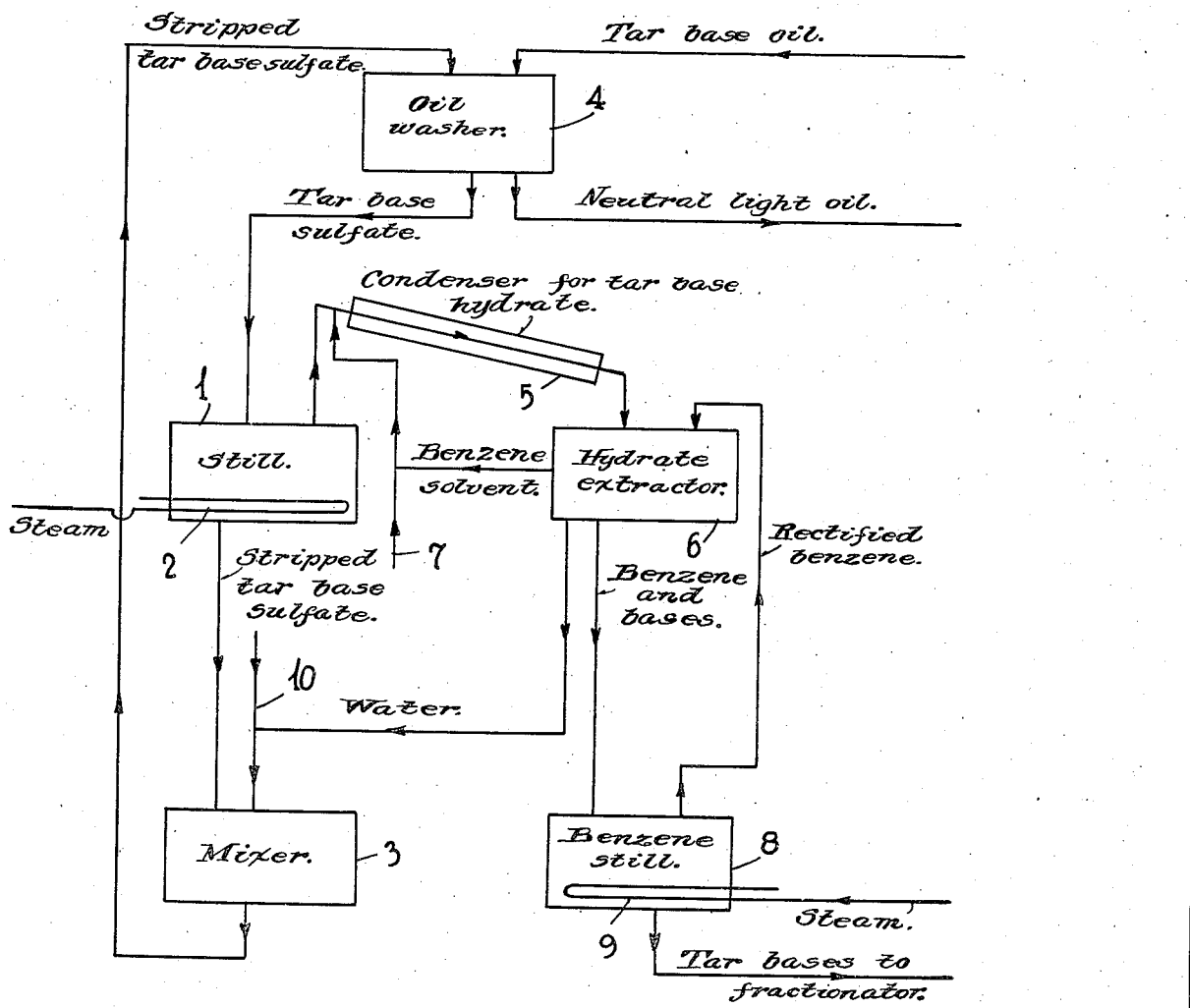

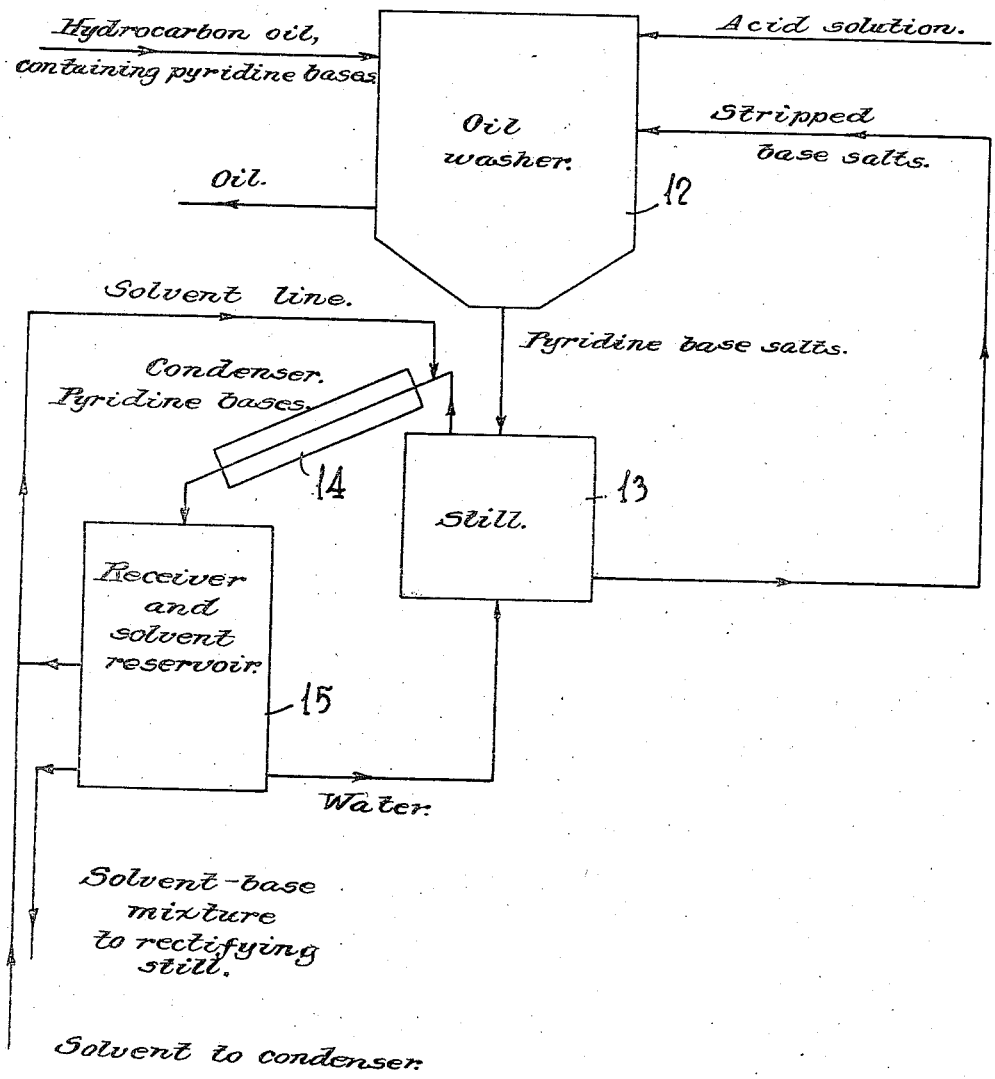

2,410,906

UNITED STATES PATENT OFFICE 2,410,906

METHODS OF RECOVERING PYRIDINE BASES

Hubert L. Stewart, Edgewood, Pa., assignor to Koppers Company, Pittsburgh, Pa., a corporation of Delaware Application March 29, 1941, Serial No. 385,935

5 Claims. (Cl. 260—290)

This invention relates to the recovery of pyridine bases. More particularly the invention relates to a method of removing pyridine bases from hydrocarbon oils containing the same.

It has been common practice in the recovery of pyridine bases from, for instance, coal tar light oil to charge the oil into a lead-lined acid washer and to treat the oil with an aqueous solution of sulphuric acid. The resulting pyridine base sulphate solution is withdrawn from the bottom of the washer and is treated with an aqueous solution of caustic soda. The pyridine bases are thereby liberated and a layer thereof is formed on top of the aqueous phase, the latter containing principally sodium sulphate in solution. After thorough settling, the sodium sulphate solution is drained into the sewer carrying with it some bases which in time results in appreciable losses in bases as well as in sodium hydroxide and sulphuric acid. The sprung bases are subjected to fractional distillation for separation into base fractions of different grades. In this distillation a "heads" cut is obtained first which contains water and some of the valuable low-boiling bases. This "heads" cut is mixed with benzol to dissolve out some of these valuable bases. The resulting benzol solution is fractionated to separate the benzol from dissolved tar bases which latter are combined with other recovered bases. The entire procedure is characterized by high reagent costs and considerable losses of bases.

An object of the present invention is to provide an improved process of recovering pyridine bases from hydrocarbon oil containing the same, whereby losses in bases and in reagents are reduced. A further object is to provide a recovery process in which the use of caustic alkali is entirely eliminated and in which acid regenerated from base salts is readily recovered and conditioned for reuse. Another object is to provide a process in which a solvent, if desired, may be effectively employed.

In the process of the present invention, hydrocarbon oil containing pyridine bases, such as, pyridine and its homologues, including the picolines (monomethyl pyridines), lutidines (dimethyl pyridines), higher polymethyl pyridines, and such as quinoline, iso-quinoline, and their homologues, either singly or in any combination, is mixed with an aqueous solution of an acid such as sulphuric acid, or phosphoric acid to extract the bases from the oil in the form of salts. The extracted pyridine base salt material is separated from the oil and heated, and the base material is distilled off. The acid residue is used for extracting bases from additional oil containing same. Thus the acid is cyclicly employed in the extraction and distillation treatments.

The acid for extraction purposes is preferably employed as a dilute aqueous solution. The pyridine bases dissolved in this solution are in the form of salts of the acid which salts upon heating are split into the acid and free pyridine bases. The pyridine bases are vaporized along with preferably relatively large volumes of water. Upon condensation of the vapors under such conditions, pyridine base hydrate is formed. Benzene or other water-immiscible solvent such as trichlorethylene, cyclohexane, hexane, isopropyl ether, or the like, may be employed to extract the pyridine bases from the pyridine base hydrate or from the condensed mixture of pyridine bases and water. The solvent employed should have a boiling point substantially different from that of the pyridine bases. Of the solvents mentioned, benzene is preferred for use in this extraction.

The solvent solution of pyridine base material is thus separated from water and is distilled to recover the solvent which is reused for extracting additional base material. The solvent-free base material is then fractionated to obtain whatever fractions of base material are desired. Water from the solvent still may be employed to dilute the acid residue obtained in the distillation of pyridine bases from the base salts, the diluted acid residue serving in the removal of additional bases from oil.

In extracting bases from the aqueous material evaporated from the base salts, it has been found highly desirable to have the solvent present in the condenser for the vaporized bases and water, and to treat the bases with solvent immediately upon condensation. To accomplish this the solvent is introduced at the vapor inlet of the condenser. By so doing, less than 2% of the bases in the distillate remains in the water, whereas as much as twice that amount of bases remains in the water when the solvent is not contacted with the distillate until after leaving the condenser or some time thereafter.

The process may be a continuous process or a batch process.

By way of illustrating the present invention and more specifically setting forth the steps in the process, the following examples are presented:

*Example 1.*—This example is set forth in connection with the flow sheet shown in Fig. 1 of the accompanying drawings.

Coal tar light oil, after it has been treated to remove tar acids contains about 7% tar bases. Initially, sufficient dilute sulphuric acid, about 20 to 30% concentration in water, is mixed with the light oil from which tar acids have been removed, to convert all of the tar bases to sulphates. The initial charge may be about three parts of the oil to one part of the 25% acid, by volume. The mixture upon settling separates into two layers, the base sulphate layer and the oil layer (generally called neutral light oil). The base sulphate layer is passed into a still 1 which may be lead lined and provided with Monel metal steam heating coils 2 carrying steam at about 150 to 175 pounds pressure. The still 1 is heated to a temperature above 100° C., preferably at substantially 115° C. to 190° C. About 40% to 45% of the bases are thus distilled with about five times their volume of water.

This distillation is continued in this manner while residue that accumulates in the still is conducted to a mixer 3. The water in the distillate is separated from the distilled bases and is also conducted to the mixer 3 wherein the stripped tar base sulphate from the still 2 and the water separated from the distillate are mixed in the proportion of about 270 gallons of the stripped sulphate to about 400 gallons of the water. The resulting diluted stripped sulphate is conducted to a so-called oil washer 4 into which is fed tar base oil from which bases are to be extracted. The proportion of diluted stripped sulphate and tar base oil normally containing about 7% bases is about 670 gallons of the former to about 1430 gallons of the latter. Neutral light oil and tar base sulphate are drawn off separately from the washer, the tar base sulphate passing to the still 1.

The vapors from the still 1 pass into a condenser 5. The condensates from the condenser pass into an extractor 6. Benzene or other water-immiscible solvent, initially introduced through a pipe 7 from some outside source, is circulated through the condenser 5 in contact with the condensates and vapors from the still 1. The solvent extracts the bases from the water or hydrate. The solvent with dissolved bases, and water are separated in the extractor 6 and separately withdrawn therefrom. The separated water is passed to the mixer 3 with the desired proportion of sulphate residue from the still 1 as indicated above.

The solvent extract separated in the extractor 6 is passed to a still 8 provided with a closed steam coil 9. The solvent is distilled from the base solution and is returned to the extractor 6 to extract bases from additional base distillate. Solvent from the extractor 6 or fresh solvent introduced through pipe 7 is circulated in the base condenser cycle, and as the concentration of circulated base solution builds up to a desired point the solution is conducted to the still 8. The residue from the still 8 from which solvent has been removed is sold as such or if it comprises a mixture of tar bases it may be fractionated into a plurality of desired fractions.

Water and acid may be introduced into the acid cycle from time to time through a pipe 10. If desired, fresh acid may be used to wash separated light oil a second time, and the resulting acid solution introduced into the acid cycle. Also, if desired, the first five per cent of distillate from the still 1 may be returned to the crude light oil, particularly if it contains neutral oils that must be excluded from the finished tar bases. As is generally found to be the case, substantially all of the oil dissolved or suspended in the tar base sulphate is removed in the first 5% or less of the distillate. If this 5% or less of the distillate is collected separately the remaining distillate is recoverable as a substantially oil-free product.

*Example 2.*—Reference is made in this example to the flow sheet in Fig. 2 in the accompanying drawings.

About 8000 to 9000 gallons of hydrocarbon oil containing substantially 225 gallons of recoverable pyridine bases are mixed with about 1000 gallons of 25% to 30% sulfuric acid or phosphoric acid in a tank 12. The mixture is permitted to separate into two layers, an oil layer and an aqueous pyridine base sulphate layer. About 1600 gallons of the sulphate layer are passed to a still 13 where the sulphate solution is heated to about 115° C. to evaporate pyridine bases and water. About 960 gallons of distillate containing about 23.4 per cent pyridine bases are obtained, the vapors from the still 13 being condensed in a condenser 14 and the condensate passing to a receiver 15. The condensate is initially mixed with about 500 gallons of water-immiscible solvent and during distillation the solvent is circulated through the condenser 14. About 725 gallons of a solution of bases in the solvent are separated from about 735 gallons of the distilled water. From the base solution about 225 gallons of pyridine bases are recovered by distillation and the solvent is reused in the condenser (14) cycle.

The 735 gallons of water obtained in the receiver 15 are mixed with the residue (640 gallons) in the still 13, making a total of 1375 gallons having a 10 to 11 per cent free acid equivalent. This diluted residue is passed from the still 13 to the tank 12 and mixed with about 8000 gallons of hydrocarbon oil containing about 225 gallons of recoverable pyridine bases. Thus the cycle is continued and about a three per cent acid make-up may be added to each batch of oil treated.

It is to be noted that no caustic soda solution is used in the process of the present invention and that the amount of sulphuric acid needed is greatly reduced by the acid cycle. Caustic soda is an expensive reagent and causes considerable difficulty in storing. When used for extraction, the caustic soda solution must be used hot which is itself costly. Furthermore, it attacks piping and other metal equipment, thus increasing maintenance costs.

Alternate washings of oil with sulphuric acid and caustic soda result in the formation of substances that are excellent emulsifying agents which render it difficult to separate treated oil from bases. Losses resulting from discarding the inseparable constituents are considerable. Such losses are avoided in the herein-claimed process.

The present process is substantially foolproof. It requires relatively little laboratory control. The acid remains in the acid cycle and requires little or no checking.

It is to be understood that the term "pyridine" in the appending claims refers to any one of the organic nitrogenous bases singly or to a mixture of bases. The oil treated may be particularly coal tar oil, although petroleum oil and other pyridine-bearing oils may also be processed in the manner described.

What is claimed is:

1. In a process of recovering pyridine from hydrocarbon oil containing it by means of mineral acid of relatively low volatility, a combination of steps consisting of the following in progressive succession, as enumerated: (1) contacting said oil and an aqueous solution of said mineral acid selected from a group consisting of sulphuric acid and phosphoric acid of about 20 to 30% concentration to convert the pyridine to pyridine salt of said acid, (2) removing the resulting pyridine salt in said aqueous solution from the oil, (3) heating the separated aqueous solution of pyridine salt to distill off free pyridine and to leave a mineral acid residue, and (4) introducing in liquid form substantially water-insoluble volatile solvent for pyridine into vapors resulting in the course of distillation in step 3, to thereby separate pyridine from the vapors.

2. In a process of recovering pyridine from hydrocarbon oil containing it by means of mineral acid of relatively low volatility, a combination of steps consisting of the following in progressive succession, as enumerated: (1) contacting said hydrocarbon oil and an aqueous solution of said mineral acid selected from a group consisting of sulphuric acid and phosphoric acid of about 20 to 30% concentration to convert the pyridine to pyridine salt of said acid, (2) removing the resulting pyridine salt in said aqueous solution from the oil, (3) heating the separated aqueous solution of pyridine salt to distill off free pyridine and a relatively large proportion of water and to leave a mineral acid residue while contacting resulting mixed free pyridine and water vapors in initial stages of condensation thereof with substantially water-insoluble liquid solvent for pyridine separable from the pyridine by distillation, and (4) admixing resulting condensed water with acid in said residue to recondition the latter for extracting pyridine from additional oil containing it.

3. In a process of recovering pyridine from hydrocarbon oil containing it, which process consists in separating pyridine from the oil in aqueous solution as a pyridine salt of an acid of relatively low volatility selected from a group consisting of sulphuric acid and phosphoric acid of about 20 to 30% concentration and liberating pyridine from said salt by distillation, the step consisting of distilling from said aqueous solution free pyridine and a relatively large proportion of water while contacting resulting overhead of mixed free pyridine and water vapors in initial stages of condensing in said distilling, with substantially water-insoluble liquid solvent for pyridine the said pyridine and solvent being separable from each other by distillation.

4. In a process of recovering pyridine, in which process separation of pyridine from hydrocarbon oil consists in treating said oil with aqueous solution of mineral acid of relatively low volatility selected from a group consisting of sulphuric acid and phosphoric acid of about 20 to 30% concentration and removing the pyridine from the resulting acid solution by distillation, the step of introducing in liquid form substantially water-insoluble volatile solvent for pyridine into the overhead water and pyridine vapors resulting in the course of said distillation, to thereby separate the pyridine from the water, the said pyridine and solvent being separable from each other by distillation.

5. In a process of recovering pyridine from hydrocarbon oil, the combination of steps consisting of distilling pyridine and water from an aqueous mineral acid solution in which said mineral acid is of relatively low volatility, selected from a group consisting of sulphuric acid and phosphoric acid of about 20 to 30% concentration, while introducing, in liquid form, substantially water-insoluble, volatile solvent into the overhead of hot water vapors and pyridine vapors formed in the course of the distillation; and separating the condensate from said distillation into a solvent layer containing pyridine, and an aqueous layer.

HUBERT L. STEWART.